United States Patent [19]

Walleston

[11] Patent Number: 5,225,828
[45] Date of Patent: Jul. 6, 1993

[54] INFRARED IDENTIFICATION BEACON

[75] Inventor: Robert J. Walleston, Newton, N.H.

[73] Assignee: Test Systems, Inc., Hudson, N.H.

[21] Appl. No.: 694,138

[22] Filed: May 1, 1991

[51] Int. Cl.$^5$ .................................................. G08G 5/00
[52] U.S. Cl. ..................................... 340/953; 340/947
[58] Field of Search ............... 340/947, 948, 952, 953, 340/956, 981, 982, 321, 331, 332, 983; 362/277, 267, 186, 187; 342/33, 34

[56] References Cited

U.S. PATENT DOCUMENTS

| | | | |
|---|---|---|---|
| 2,304,742 | 12/1942 | Officer et al. | 362/187 |
| 2,647,254 | 7/1953 | Brunnhoelzl | 340/321 |
| 3,519,984 | 7/1970 | Zychal | 340/953 |
| 3,731,082 | 5/1973 | Blaylock | 340/981 |
| 4,429,351 | 1/1984 | Petzl et al. | 362/277 |
| 4,530,039 | 7/1985 | Shin-Shi | 362/187 |
| 4,554,544 | 11/1985 | Task | 340/947 |
| 4,590,471 | 5/1986 | Pieroway et al. | 340/947 |
| 4,707,696 | 11/1987 | Task et al. | 340/947 |
| 4,835,512 | 5/1989 | Bratton | 340/458 |

Primary Examiner—Jin F. Ng
Assistant Examiner—Brent A. Swarthout
Attorney, Agent, or Firm—Robert T. Dunn

[57] ABSTRACT

A beacon device for alerting friendly personnel on land, sea or air, from close proximity up to several miles, that the beacon location is also friendly, is contained in an upright case that has an least one infra-red (IR) light emitting diode and a visible light emitting diode clustered together at the top of the case, from which overlapping IR and visible light beacons emanate upward when the case is upright and means including one or more switches on the device or remote from the device are provided for controlling electric power to the diodes. In a preferred embodiment an adjustable collar surrounding the clustered diodes is moveably attached to the case and is moveable downward on the case to intercept less of the overlapping beacon light so that the elevation angle ($\theta$) of the beacon is relatively low and is moveable upward on the case to intercept more of the overlapping beacon light so that the elevation angle ($\theta$) of the beacon is relatively high.

23 Claims, 5 Drawing Sheets

INFRARED IDENTIFICATION BEACON

BACKGROUND OF THE INVENTION

This invention relates to beacons that radiate as an identification of the location of the beacon and more particularly to such beacons that are readily portable by an individual and identify the beacon location to friendly observers at a great distance.

Emergency lighting devices are sometimes portable and used to identify temporary military runways for fixed wing aircraft and landing areas for helicopters. These include battery powered marker lights that identify a runway and illuminators of a helicopter landing pad. For both of these, some light generating devices have projected infra-red light and the pilots who are guided by the light have been equipped with night vision goggles that detect infra-red and give the pilot a visible light image of the scene. There are several reasons for using infra-red radiation: (1) even low light levels of infra-red light can be seen several miles away by a pilot equipped with night vision goggles; (2) infra-red light is not obscured by visible lights; and (3) infra-red light cannot be seen except by pilots wearing night vision goggles and so is, therefore not visible to unfriendly pilots who do not have night vision goggles. In all cases, with such emergency lighting devices used by the military, the purpose is to identify an area on the ground to a pilot to aid the pilot to land his aircraft at that area.

Portable emergency beacons that identify an individuals location to the world have been used in many situations, including military. They are used by downed aircraft, ships and boats of all kinds and individuals. The purpose of all of these is to attract attention and so initiate a rescue. Some flash visible light, some transmit radio signals and many do both. They are designed to withstand water immersion, shock and heat and most contain an energy source, such as a long life battery. In all cases they radiate and/or transmit omni-directionally at all elevation angles and the purpose is to attract anyone and everyone.

Beacons that identify the location of friendly military personnel, on the other hand, are intended to attract only friendly observers and, above all, must avoid attracting unfriendly observers (the enemy). In that respect, such beacons are similar to the military lighting devices mentioned above that are used to identify temporary military runways for fixed wing aircraft and landing areas for helicopters. However, the purpose and function of beacons for identifying the location of friendly personnel is different from those aircraft landing aids.

It is an object of the present invention to provide a readily portable (by an individual) beacon that identifies the individual or his vehicle only to friendly observers.

It is another object of the present invention to provide such a beacon with a self contained power supply packaged and contained to withstand moisture and dirt and harsh ambient conditions.

It is another object of the present invention to provide such a beacon that transmits more than one type of radiation of different visibility that is predetermined to attract only friendly observers at substantially different ranges (distances), particularly at night.

It is another object of the present invention to provide such a beacon that is adjustable so that the radiation therefrom can be restricted to friendly directions.

It is another object of the present invention to provide such a beacon that is adjustable so that the radiation therefrom can be restricted to the direction of friendly aircraft at night or in dim ambient light.

It is another object of the present invention to provide such a beacon incorporating means indicating to friendly personnel in close proximity that the beacon is in operation.

It is another object of the present invention to provide such a beacon incorporating means for remotely controlling the beacon.

SUMMARY OF THE INVENTION

A beacon device for alerting friendly personnel on land, sea or air, from close proximity up to several miles, that the beacon location is also friendly, is contained in an upright case that has an least one infra-red (IR) light emitting diode and a visible light emitting diode clustered together at the top of the case, from which overlapping IR and visible light beacons emanate upward when the case is upright and means including one or more switches on the device or remote from the device are provided for controlling electric power to the diodes.

In a preferred embodiment an adjustable collar surrounding the clustered diodes is moveably attached to the case and is moveable downward on the case to intercept less of the overlapping beacon light so that the elevation angle ($\theta$) of the beacon is relatively low and is moveable upward on the case to intercept more of the overlapping beacon light so that the elevation angle ($\theta$) of the beacon is relatively high.

Also in a preferred embodiment, a relatively low power indicator light is provided on the outside of the case for indicating to personnel in the immediate vicinity that the beacon is turned on and a receptacle for a cable connector is provided on the outside of the case to accommodate a beacon control cable from a remote control location.

DESCRIPTION OF EMBODIMENTS OF THE INVENTION

Dual Overlapping Beacons

The beacon device according to the present invention measures only a few inches in height and across, weighs less than a pound, requires no external power and can be attached readily and quickly to any vehicle, equipment or building by an individual. The purpose is to alert friendly personnel on land, sea or air, at relatively close proximity (up to a few thousand feet) and at distances of several miles, that the vehicle, equipment, building or individual is friendly, while at the same time not attracting the attention of enemy personnel near or far.

Figure 1:
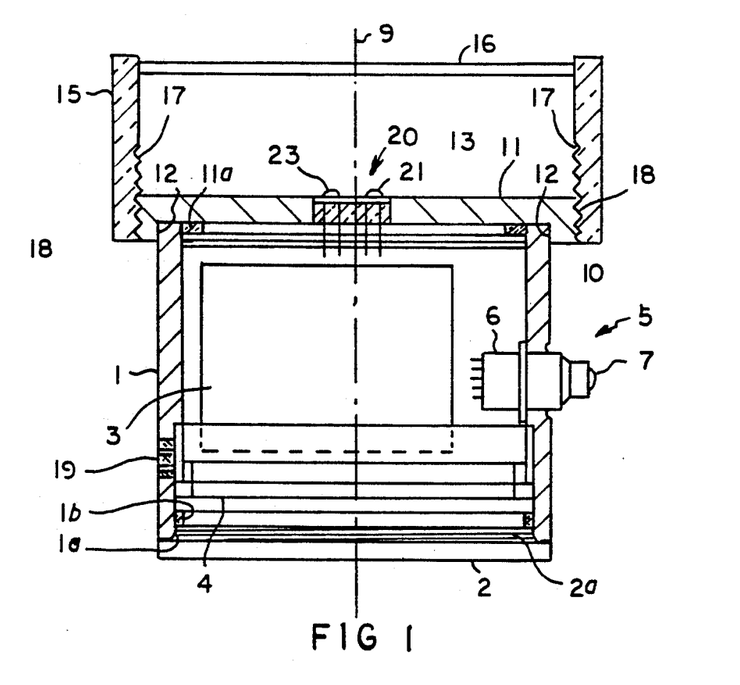
FIG. 1 is a side, partially broken away view of the beacon according to the present invention.
Figures 2A, 2B:
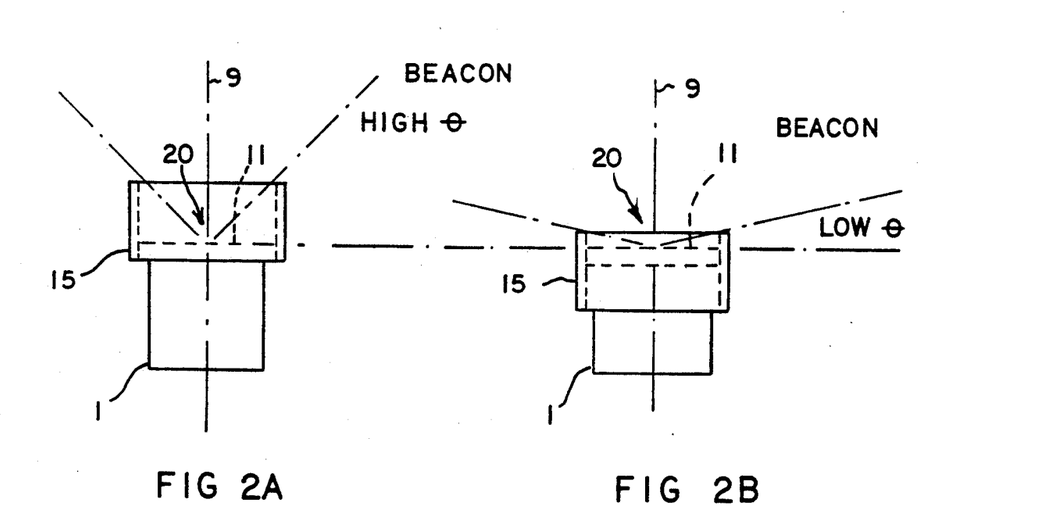
FIGS. 2A and 2B are side views of the beacon adjusted to radiate relatively narrow and relatively broad beams, respectively.

As shown in FIGS. 1 and 2, a cylindrical aluminum case 1 defining the beacon axis 9 is closed at the bottom by a Delrin base plate 2 that insulates the cylinder and its contents electrically and thermally from whatever the beacon is attached to. The base plate is attached to the bottom of the cylinder by a threaded portion 2a thereof and matching threads 1a on the inside of the cylinder. A resilient gasket 1b between the base plate and cylinder seals the bottom against dirt and moisture.

The cylinder contains a battery pack 3 and recharging transformer 4 (at the bottom), an on/off switch assembly 5 including the on/off switch 6 and indicator light 7 mounted in the side of the cylinder, and a printed circuit board (PCB) 10 at the top of the cylinder. The PCB 10 is carried by the cylinder top cap 11 that seals at its perimeter 12 to the top of the cylinder by resilient gasket 11a and is secured by screws 11b, shown in FIG. 3.

Figure 3:
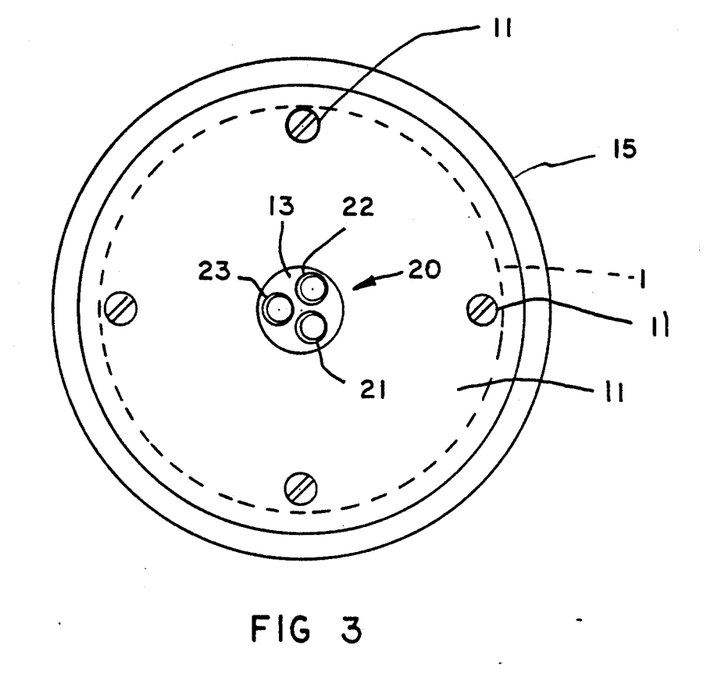
FIG. 3 is a top view of the beacon showing the radiators (sources) of infra-red and visible light.

The top cap also carries at the center thereof an assembly 20 of beacon light sources that includes two infra-red (IR) light emitting diodes (IR-LED)s 21 and 22 and one visible light emitting diode (V-LED) 23 that are clustered close together so that all are very close to the axis of the cylinder. These LEDs 20 are mounted in an electrically insulating plug 13 that is sealed to the cap at the center thereof and are all held so that when energized they all radiate substantially omni-directionally from the outside face of the cap. This means that when the beacon is oriented upright as shown with its axis 9 vertical, the beacon light is even at all azimuths.

Elevation Limitation of Beacons

An adjustable cylindrical Delrin collar 15 containing a transparent window cover of Lexan material threadably engages the outer perimeter 12 of the cap by matching threads 17 and 18 and functions as an adjustment of the directivity of the radiation patterns of the three LEDs 20. In other words, the collar adjusts the directivity of the beacon. This adjustment is illustrated in FIGS. 2A and 2B. When the collar 15 is screwed down on the cylinder as shown in FIG. 2B the beacon is least directive and the pattern of light is broadest, so that when it is mounted vertical the beacon light is visible in all azimuth directions almost down to the horizon and the elevation angle ($\theta$) is low. On the other hand, when the collar is screwed upward off of the cylinder as shown in FIG. 2A the beacon is most directive and the pattern of light is narrowest, so that when it is mounted vertical the beacon light is still visible in all azimuth directions, but only down to a relatively high angle ($\theta$).

The on/off switch assembly 5 is shown in FIG. 1. It may be a push button switch and turns on energy to the LEDs when it is pushed and released and turns off energy to the LEDs when it is pushed again and released, and so forth. This is sometimes called a self latching single pole, double throw switch. A small low power indicator light 7 that may be contained within the switch button is turned on with the LEDs 20 and so indicates to personnel in the immediate vicinity (up to about 100 feet) that the beacon is turned on. A battery recharging receptacle 19 is provided in the cylinder wall next to the recharging transformer 4 to receive an AC battery recharging plug (not shown), so that the battery can be recharged from an external AC source, such as the AC source on a military vehicle.

For mounting the beacon on, for example, a military land vehicle, a strip or pad 24 (see FIG. 4) of Velcrolike material may be attached to the bottom of the beacon on the outside of the Delrin base so that the beacon can be stuck to a corresponding pad 25 attached to the vehicle.

For military purposes the beacon device is small and rugged. The cylindrical case may be only four inches in diameter and about three inches long, the cylindrical collar may be about four and a half inches in diameter and an inch and a half to two inches long and the beacon with battery may weigh no more than a few pounds. Thus, military personel can carry several of the beacons without burden and can deploy the beacons by simply setting them on the ground and turning on the switch.

Single Mode Operation

Figure 4:
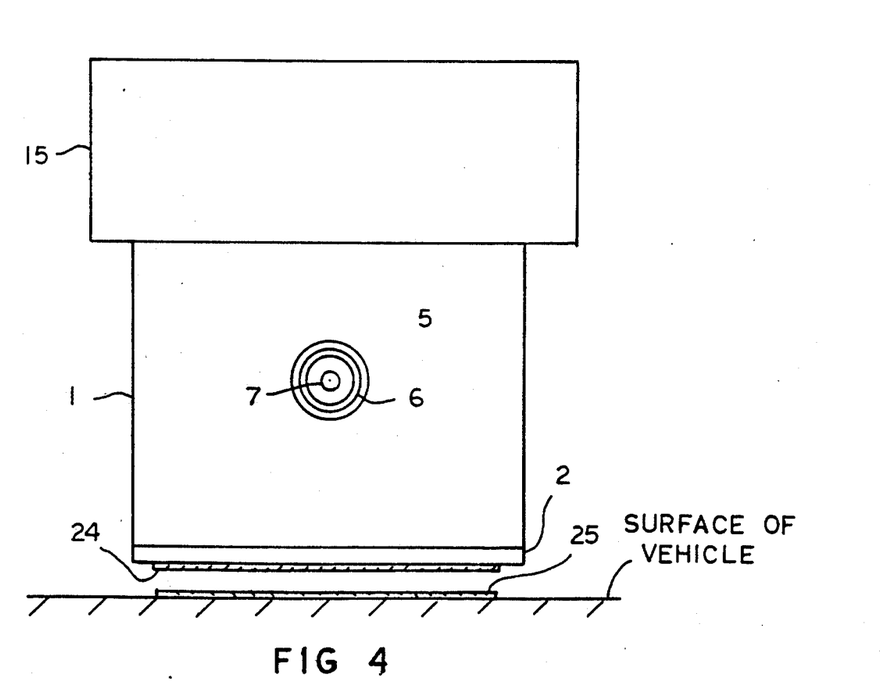
FIG. 4 is side view showing the beacon controls (switch) and an indicator light, which is visible to friendly personnel in close proximity that the beacon is in operation.

The embodiment shown in FIG. 4 operates in only one mode, the steady or continuous beacon mode, and with both the infra-red and the visible light beacons on and off together. This embodiment has one switch 6 and one indicator light 7. The switch controls all of the beacon LEDs 20 and the indicator light 7. Thus, the indicator light 7 when turned on, indicates that both beacons are turned on. The circuits for this embodiment include the regulated power supply 10a on PCB 10, shown in FIG. 8, but do not include the pulse generating circuit 10b in that figure. The embodiment in FIG. 4 may include a circuit (not shown) on PCB 10 for detecting low battery charge and that circuit may turn on another indicator light (another indicator LED) to indicate to personel in the immediate area that the battery is low and needs recharging.

Dual Mode Operation

Figure 5:
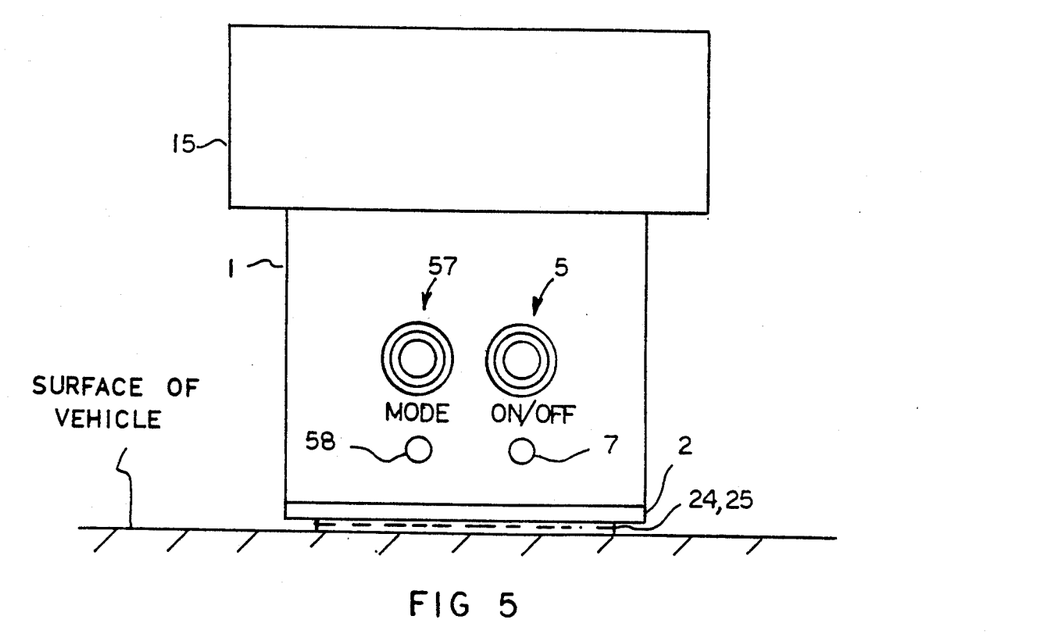
FIGS. 5 and 6 are side views of two embodiments showing the beacon control switch(es) for steady and flashing beacon operation and indicator(s) to friendly personnel in very close proximity that the beacon is in operation.
Figure 7:
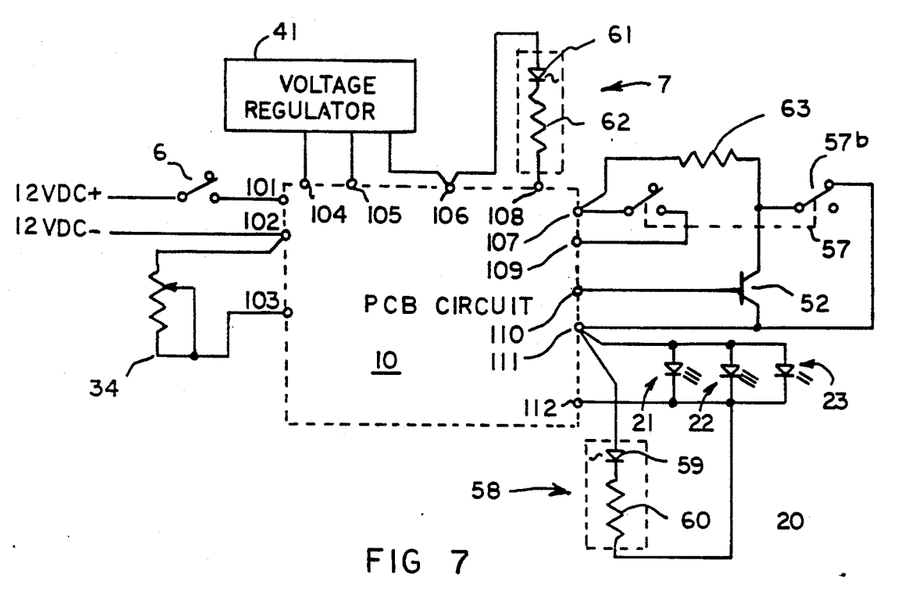
FIG. 7 is an electrical diagram showing the entire electrical system contained by the portable beacon and including the printed circuit board (PCB) containing a suitable power supply for energizing the infra-red and visible light radiators to produce steady beacons and/or pulsed beacons.
Figure 8:
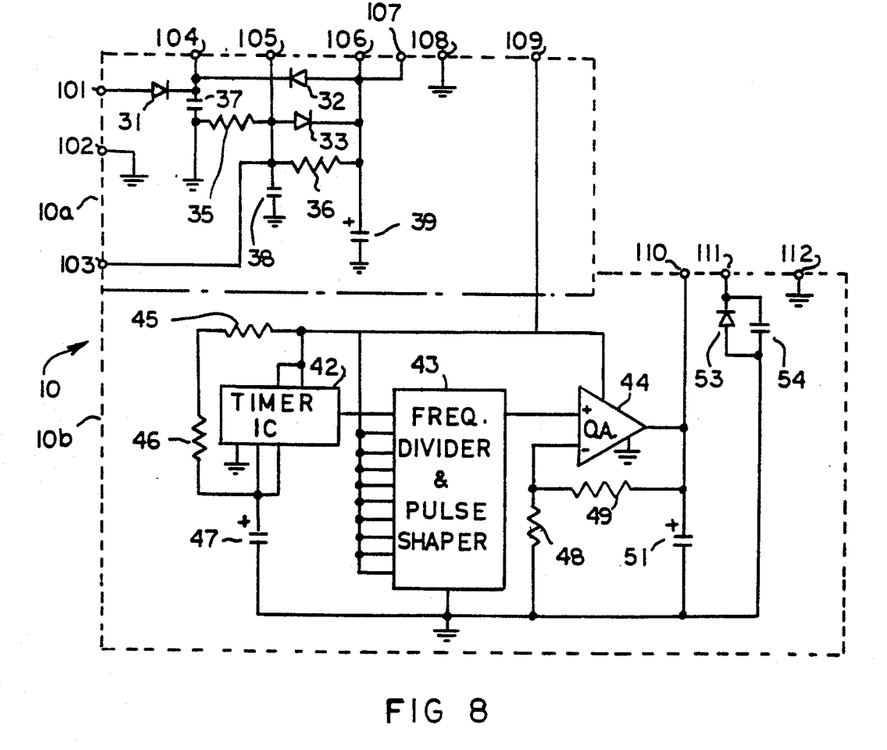
FIG. 8 is a circuit diagram of suitable circuits on the PCB for providing the power supply and pulse forming circuit where the pulsed operation mode is desired.

The embodiment shown in FIG. 5 has greater capacity. It can operate the infra-red and visible beacons in a flashing mode as well as the steady or continuous mode. Here, a second switch assembly 57 is provided that sets the beacon mode: continuous or flashing and another indicator light 58 is provided that indicates the mode to personel in the immediate area. For this embodiment, the pulse generating circuits 10b would be included on PCB 10 as shown in FIGS. 7 and 8. An embodiment having these mode features could be provided with only one indicator light that would glow steady when the beacons were on steady and would flash when the beacons were flashing to give the same infirmation to personal in the immediate area.

Figure 6:
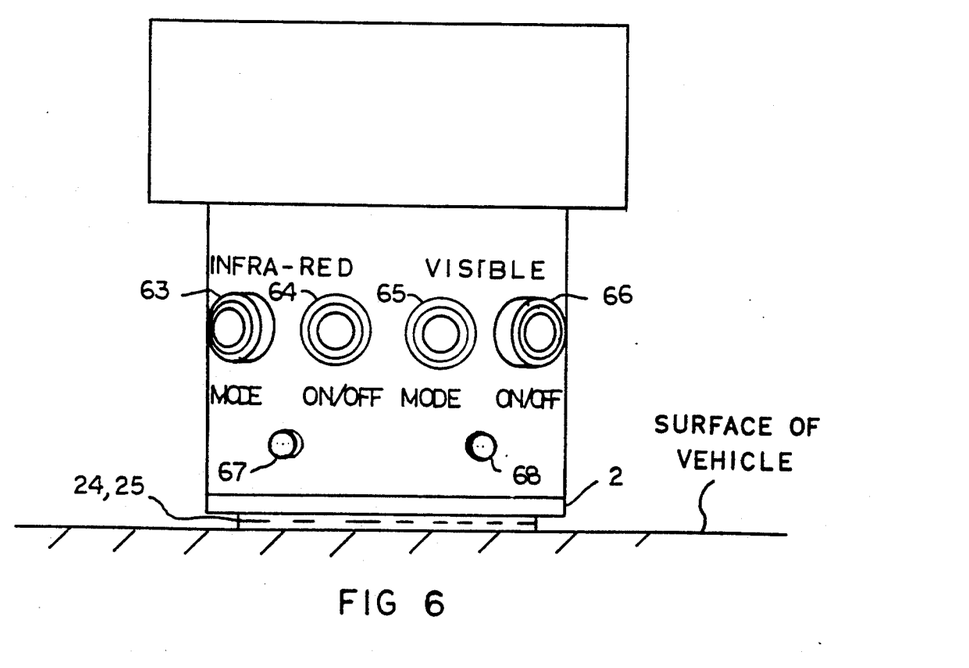

FIG. 6 shows another embodiment that includes all of the features of the embodiment in FIG. 5. Here there are four switches 63 to 66 of which two, 63 and 64, control the infra-red beacons and the other two, 65 and 66 control the visible light beacon; and there is an indicator light for each beacon. Indicator light 67 indicates the status of the infra-red beacons and indicator light 68 indicates the status of the visible light beacon. Thus, the infra-red and visible light beacons are independently controlled and each can be operated steady or flashing.

Circuits

FIG. 8 shows a circuit diagram of the elements on the printed circuit board (PCB) 10. The board has terminals along its edges denoted by the dotted line for connection to electrical parts external of the board, such as switch 6, LEDs 20, etc. FIG. 7 shows the circuits contained within the beacon device external of the PCB 10 connected to these terminals. On PCB 10 shown in FIG. 8 and connected to it as shown in FIG. 7 are diodes 31, 32 and 33, resistors 34 (see FIG. 7), 35 and 36 and capacitors 37, 38 and 39 that provide a regulated power supply sub-assembly 10a with a suitable regulator 41 connected to terminals 104, 105 and 106 (see FIG. 7) and twelve volt DC output from battery pack 3 connected to external terminals 101 and 102. The variable resistor 34 connected to PCB terminals 102 and 103 and the regulated output voltage appears at terminals 107 and 108. Terminal 109 feeds this voltage to a pulse generating circuit 10b (see FIG. 8) that includes timer integrated circuit (IC) 42, frequency divider and pulse shaper IC 43 and output operational amplifier 44. Resistors 45 and 46 and capacitor 47 are proportioned to provide timing cycles at a rate of twenty four per second with the timer circuit 42 and circuit 43 divides this rate by four to provide well defined square pulses at six cycles per second. This rate is particularly noticeable to a human observer.

As shown in FIG. 8, pulses from circuit 43 are fed to operational amplifier 44 for which resistors 48 and 49 with capacitor 51 provide the required gain for the amplifier to drive external switching transistor 52 (see FIG. 7) that is connected through terminals 107 and 111 and controlled through terminal 110. Diode 53 and capacitor 54 maintain the proper switching bias at the anode terminal 111 and protect against voltage spikes for the two infra-red LEDs 21 and 22 and visible light LED 23, which are all connected between PCB terminals 111 and 112. The infra-red emitting LEDs 21 and 22 may emit in the near infra-red and have a maximum continuous output of 500 milliwatts at a wavelength of 880 nanometers. The visible light LED 23 produces visible red light and is rated at 20 milliamperes.

Beacon on/off switch 6 connects the positive terminal of the battery to PCB terminal 101. Switch 57, the beacon flashing switch, is a double pole single throw switch, that by-passes the switching transistor 52 and disconnects the voltage to the pulse generator for steady beacon mode operation (continuous illumination). Switch 57 can also be operated manually to flash a code, by simply manually turning it on and off according to a predetermined code schedule.

The indicator light 7 (that may be part of switch 5 assembly) is connected to external terminals 106 and 108 and may comprise a suitable low luminence LED 61 and dropping resistor 62. Here, indicator light 7 indicates that the beacon (LEDs 20) are turned on. As stated above, the beacon LEDs 20 launch beacons of infra-red and visible light, the infra-red beacons can be seen by observers with night vision goggles for several miles and the visible light beacon can be seen with the naked eye for several thousand feet.

Indicator light 58 is connected to external terminals 111 and 112 and is comprised of a suitable low luminence LED 59 and dropping resistor 60. Light 58 indicates the mode of operation of the beacon device: the beacons continuous or flashing. It is in circuit with the beacon LEDs 20 and when they are continuous, it is continuous, and when they are flashing, it is flashing. Clearly indicator light 58 can serve the same function as indicator light 7.

Remote Control

The switches for controlling the beacon device On/-Off and Mode can be replaced or supplemented by a remote control. The remote control can be by cable or wireless. If it is wireless, a receiver for the control signals is required in the beacon device. It is the intention herein to avoid size, weight and complexity and so remote control by cable is preferred.

Figure 9:
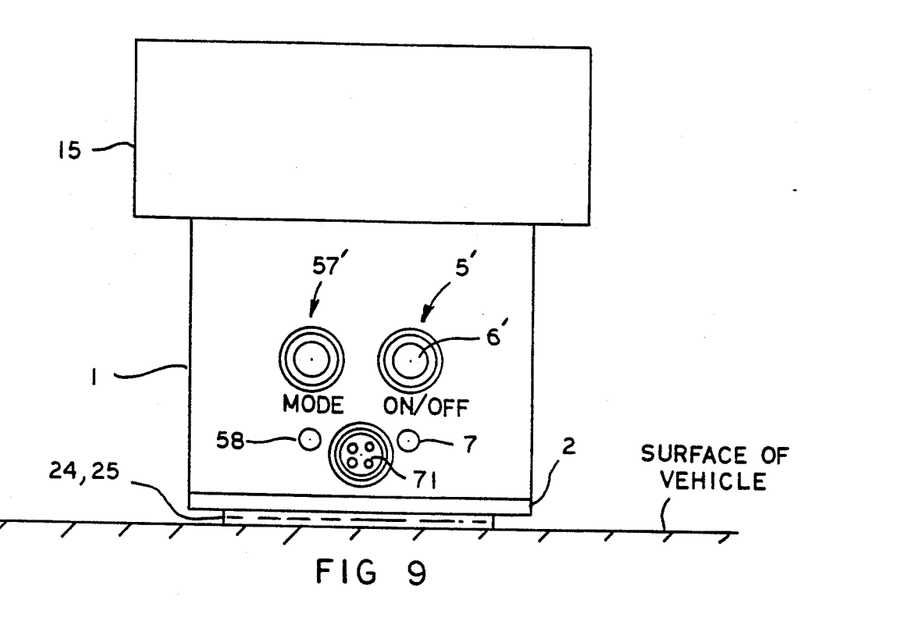
FIG. 9 ia a side view of an embodiment similar to the embodiment of FIG. 5, wherein switch controls are via a cable that connects to the beacon device by a BNC connector and control is selected at a remote location.
Figure 10:
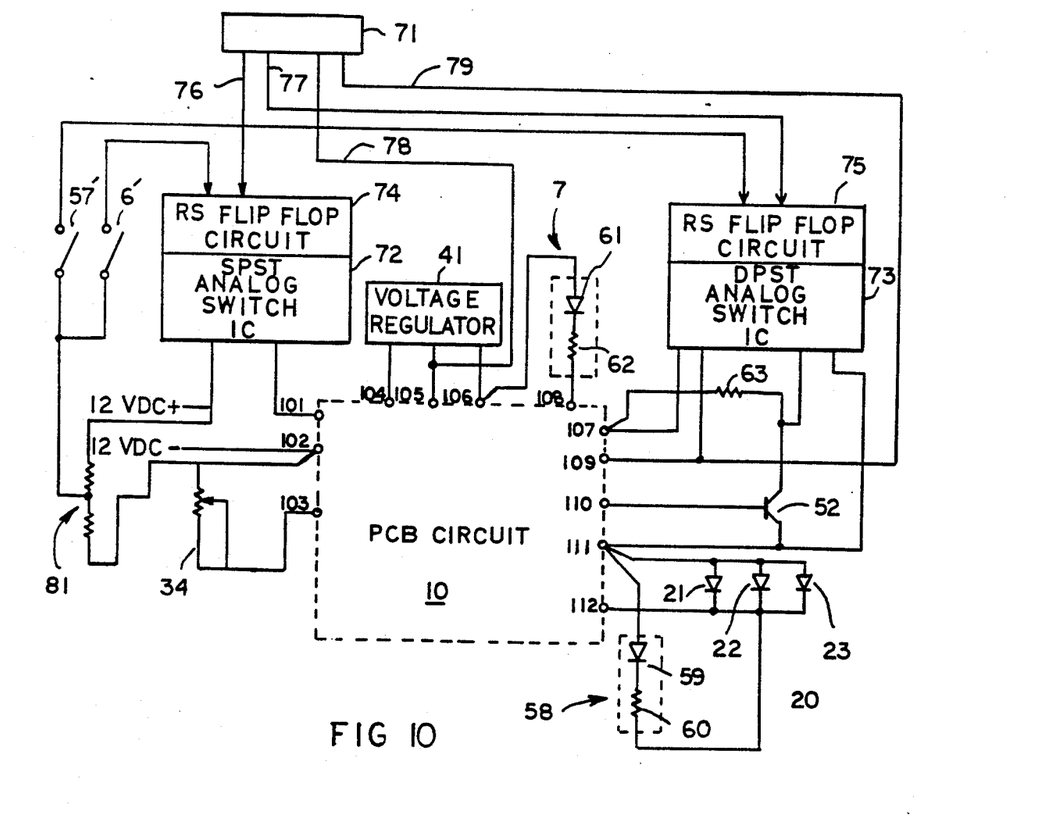
FIG. 10 is an electrical diagram showing the PCB and connections therefrom to the BNC connector.

As shown in FIG. 9, a beacon device of the kind shown in FIG. 5 is further equipped with a connector for a control cable and FIG. 10 shows how the electrical system in the device may be modified to accommodate the cable remote control sending TTL type On/-Off and Mode control signals. The cable BNC connector 71 provides a plurality of wire connection receptacles. For example, as shown in FIG. 10, two analog switch ICs 72 and 73, each controlled by a reset-set (RS) flip flop circuit 74 and 75, respectively, are connected to the beacon device circuit to replace switches 6, 57a and 57b. RS flip flop circuits 74 and 75 are sometimes called double input flip flop circuits and change state each time the signal level changes at either of their inputs.

Analog switch IC 74 functions as a single pole, single throw (SPST) switch just as does switch 6 that it replaces. Analog switch IC 75 functions as a double pole, single throw (DPST) switch just as do switches 57a and 57b that it replaces. The RS flip flop circuits 74 and 75 that control these switch ICs each have two TTL input signal inputs and change state each time either input changes. RS flip flop circuit 74 has one TTL input from cable On/Off wire 76 and another TTL input from the beacon device On/Off set switch 6'. Switch 6' can be a touch switch on the beacon device cylinder as shown on FIG. 9 that produces a TTL level signal when closed, from battery voltage divider 81. RS flip flop circuit 75 has one TTL input from cable Mode wire 77 and another TTL input from the beacon device Mode set switch 57'. Switch 57' can also be a touch switch on the beacon device cylinder as shown on FIG. 9 that produces a TTL level signal when closed, from battery voltage divider 81.

Consider operation beginning from an initial state of the beacon device turned off, because switch IC 72 is in the off position as its control flip flop circuit 74 is in the off state. Then, a TTL impulse signal initiated at the remote location in the cable On/Off wire 76 intending to turn the beacon on, will cause flip flop circuit 74 to switch its state to the On state, causing switch IC 72 to switch to the On position, feeding 12 volt DC power from the battery to PCB circuit 10 and indicator light 7 will turn on indicating that the beacon is on. At the remote location, the operator will recveive a signal in wire 78 from the beacon voltage regulator 41 indicating that the beacon is on. Following that, an operator at the beacon seeing the indicator light 7 on, and desiring to turn the beacon off, simply taps switch 6' changing an input signal to flip flop circuit 74 causing it to change state (to the Off state), causing switch IC 72 to switch to the Off position and the beacon is turned off. Thus, with this arrangement, the beacon device can be turned on and off by the TTL switch 6' on the beacon and by a TTL switch at the remote location.

By a similar operation, a TTL impulse signal initiated at the remote location in the cable Mode wire 79 intending to change the beacon Mode from steady to flashing, will cause flip flop circuit 75 to switch its state to the Flashing state, causing switch IC 73 to switch to the Flashing position, turning on the pulse generating circuit 10b in PCB 10 and feeding energizing pulses to the LEDs 20 instead of steady voltage and indicator light 58 will turn on indicating that the beacon is on in the Flashing mode. At the remote location, the operator will receive a signal in wire 79 from PCB 10 terminal 109 that the pulse generating circuit is turned on indicating that the beacon is in the Flashing Mode. Following that; an operator at the beacon seeing the Mode indicator light 58 flashing, and desiring to change the Mode to steady, simply taps switch 57' sending another input signal change to flip flop circuit 75 causing it to change state (to the beacon Steady state), causing switch IC 73 to switch to the Steady position and the beacon stops flashing and is in the Steady Mode.

Where the remote control cable supplements the control switches on the beacon device, the last operator at either location to manipulate the TTL signal switches will determine the status of operation of the beacon device and either operator can override the previous actions taken by the other. In that case, the remote control operator could not be sure of the status without signals equivalent to the signals of the indicator lights 7 and 58, provided via cable wires 78 and 79. Even if there are no control switches on the beacon device and the only control is via the cable, the remote operator must receive monitoring signals via cable wire 78 and 79 to know the status, On/Off and Mode, of the beacon device.

Where no switches are provided on the beacon device and all control is at the remote location reached by the cable, it is still desirable that status indicators be provided on the beacon device so that personnel in the immediate vicinity of the device can see the status of operation. For that purpose, status indicator lights may be provided on two sides of the beacon device cylinder 1. As described above with respect to dual mode operation of the embodiment in FIG. 4, the On/Off light 7 is turned on to indicate that the beacons are on, and the Mode light 58 is also on and steady when the beacons are steady and is on and flashing when the beacons are flashing.

An advantage of remote control to supplement the switch controls on the beacon device is that an array of many such beacon devices can be controlled simultaneously by one operator at the remote location.

Mounting and Use

In use and operation, the beacon device of any of the above described embodiments is mounted to the vehicle on the outside of the vehicle at a place thereon where the operator of the vehicle can see the indicator light(s) and so know at all times that the beacon is on or off, the mode of operation and the status of the battery. The device is mounted with the axis 9 substantially vertical. Then, the collar 15 is adjusted to adjust the elevation angle ($\theta$), depending on the situation.

When for example, hostile ground personnel are nearby, the elevation angle ($\theta$) would be adjusted to the high position shown in FIG. 2A so that the beacons can be detected only by aircraft within the high elevation angle. Among those aircraft, those relatively close (up to about 1000 yards) can see the visible beacon light with the naked eye and aircraft relatively far (up to several miles) can see the IR light with IR light detectors. On the other hand when hostile ground personnel who are not equipped with IR detectors or night vision goggles are beyond 1000 yards the elevation angle ($\theta$) can be reduced, because they are beyond the range of the visible light beacon and cannot see the IR light beacon.

For the embodiments shown in FIGS. 4 and 5, when hostile ground and aircraft are present and they lack IR detectors and all friendly ground and aircraft have IR detectors, the visible light LED 23 can be covered so that the beacon light is all IR and the angle ($\theta$) can be set for low. With the embodiment shown in FIG. 6, the IR light beacon can be turned on without turning on the visible light beacon, and so there is no need to cover or uncover any of the LEDs 20. Other combinations including or not including the visible light beacon at high or low ($\theta$) can be selected by the user, depending on the situation.

What is claimed is:

1. A beacon device for alerting friendly personnel on land, sea or air, from close proximity up to several miles, that the beacon location is also friendly, comprising,
   (a) an upright case that is closed at the bottom,
   (b) a battery pack inside the case,
   (c) at least one infra-red (IR) light emitting device carried at the top of the case, from which IR light emanates upward when the case is upright,
   (d) at least one visible (to the naked eye) light emitting device carried at the top of the case, from which visible light emanates upward when the case is upright,
   (e) said IR and visible light emitting devices are clustered in close proximity to each other,
   (f) so that said IR and visible light emitting devices produce substantially overlapping beacons and
   (g) means are provided for controlling electric power to said IR and visible light emitting devices from said battery pack,
   (h) whereby, an IR light beacon and a visible light beacon project upward from the device.

2. A beacon device as in claim 1 wherein,
   (a) said IR and visible light emitting devices are light emitting semiconductor diodes and
   (b) are mounted in a common plane that is transverse to the vertical when said case is upright.

3. A beacon device as in claim 2 wherein,
   (a) said upright case has a shape that defines an upright cylinder and has a sealed cap at one end and said case cylinder defines an axis and
   (b) said clustered IR and visible light emitting diodes are mounted in a common plane that is transverse to said axis and is even with the outside of said cap.

4. A beacon device as in claim 3 wherein,
(a) said cap outside is covered by an enclosure that is transparent to IR and visible light.

5. A beacon device as in claim 4 wherein,
(a) said overlapping beacons are even intensity at all azimuth directions with respect to said vertical axis.

6. A beacon device as in claim 5 wherein,
(a) said IR light beacon is of such intensity that it is visible to observers with conventional night vision IR goggles at a substantially greater distance from said beacon device than said visible light beacon to said observers with the naked eye.

7. A beacon device as in claim 6 wherein,
(a) means are provided for varying the elevation angle ($\theta$) of visibility of said IR and visible light beacons so that said beacons are not visible at ground positions.

8. A beacon device as in claim 1 wherein,
(a) means are provided for controlling energization of said IR and visible light beacons so that one of them can be projected without the other.

9. A beacon device as in claim 1 wherein,
(a) means are provided for controlling energization of said IR and/or said visible light beacons so that the beacon is steady or pulsed.

10. In a beacon device for alerting friendly personnel on land, sea or air, from close proximity up to several miles, that the beacon location is also friendly, and includes an upright case that is closed at the bottom, a battery pack inside the case and sources of IR and visible beacon light at the top of the case, from which the beacon light emanates upward when the case is upright, the improvement comprising:
(a) said source of IR and visible light are clustered in close proximity to each other so that said IR and visible light sources produce substantially overlapping beacons,
(b) an adjustable collar surrounding said sources of beacon light and moveably attached to said case,
(c) said adjustable collar being such that it is moveable downward on said case to intercept less of said beacon light so that the elevation angle ($\theta$) of said beacon is relatively low and
(d) said adjustable collar being such that it is moveable upward on said case to intercept more of said beacon light so that the elevation angle ($\theta$) of the beacon is relatively high.

11. A beacon device as in claim 10 wherein,
(a) said IR and visible light sources are light emitting semiconductor diodes and
(b) are mounted in a common plane that is transverse to the vertical when said case is upright.

12. A beacon device as in claim 11 wherein,
(a) said upright case has a shape that defines an upright cylinder and has a sealed cap at said top end and said case cylinder defines an axis and
(b) said clustered IR and visible light emitting diodes are mounted in a common plane that is transverse to said axis and is even with the outside of said cap.

13. A beacon device as in claim 12 wherein,
(a) said cap outside is covered by an enclosure that is transparent to IR and visible light.

14. A beacon device as in claim 13 wherein,
(a) said IR and visible light form overlapping beacons that are even intensity at all azimuth directions with respect to said vertical axis.

15. A beacon device as in claim 14 wherein,
(a) said IR light beacon is of such intensity that it is visible to observers with conventional night vision IR goggles at a substantially greater distance from said beacon device than said visible light beacon to said observers with the naked eye.

16. A beacon device as in claim 15 wherein,
(a) said adjustable collar threadably engages the top of said case and is moved downward and upward on said case by screwing it on or off said case for low and high, respectively, visibility elevation angles ($\theta$) of said beacons,
(b) whereby visibility of said IR and visible light beacons at ground positions is controlled.

17. A beacon device as in claim 12 wherein,
(a) means are provided for controlling energization of said IR and visible light beacons so that one of them can be projected without the other.

18. A beacon device as in claim 10 wherein,
(a) means are provided for controlling energization of said IR and/or said visible light sources so that the beacon is steady or pulsed.

19. A beacon device for alerting friendly personnel on land, sea or air, from close proximity up to several miles, that the beacon location is also friendly, comprising,
(a) an upright case that is closed at the bottom,
(b) a battery pack inside the case,
(c) at least one infra-red (IR) light emitting device carried at the top of the case, from which IR light emanates upward when the case is upright,
(d) at least one visible (to the naked eye) light emitting device carried at the top of the case, from which visible light emanates upward when the case is upright and
(e) said IR and visible light emitting devices are clustered in close proximity to each other,
(f) so that said IR and visible light emitting devices produce substantially overlapping beacons and
(g) means for controlling electric power to said IR and visible light emitting devices from said battery pack including a cable from said beacon device to a remote control location and switching means connected to said cable at said remote location,
(h) whereby, an IR light beacon and a visible light beacon project upward from the device as controlled from said remote location.

20. A beacon device as in claim 19 wherein,
(a) said IR and visible light emitting devices are light emitting semiconductor diodes and
(b) are mounted in a common plane that is transverse to the vertical when said case is upright.

21. A beacon device as in claim 20 wherein,
(a) said upright case has a shape that defines an upright cylinder and has a sealed cap at one end and said case cylinder defines an axis and
(b) said clustered IR and visible light emitting diodes are mounted in a common plane that is transverse to said axis and is even with the outside of said cap.

22. A beacon device as in claim 21 wherein,
(a) said cap outside is covered by an enclosure that is transparent to IR and visible light.

23. A beacon device as in claim 22 wherein,
(a) said overlapping beacons are even intensity at all azimuth directions with respect to said vertical axis.

* * * * *